United States Patent [19]

Mason

[11] Patent Number: 4,482,038

[45] Date of Patent: Nov. 13, 1984

[54] DOUBLE ACTIVE DRIVE MECHANISM

[75] Inventor: Murray R. Mason, Kent Bridge, Canada

[73] Assignee: Canadian Fram Limited, Canada

[21] Appl. No.: 370,768

[22] Filed: Apr. 22, 1982

[51] Int. Cl.³ .................. F16D 27/08; F16D 21/06; F16D 27/10

[52] U.S. Cl. .................. 192/48.2; 192/48.9; 192/48.91; 192/84 C; 192/90

[58] Field of Search .......... 192/48.2, 48.7, 48.9, 192/48.91, 90, 84 C, 18 B

[56] References Cited

U.S. PATENT DOCUMENTS

| | | | |
|---|---|---|---|
| 2,767,816 | 10/1956 | Hussa | 192/48.91 |
| 2,881,597 | 4/1959 | Jacobs | 192/84 C X |
| 3,062,346 | 11/1962 | Sharpe | 192/48.91 X |
| 3,171,525 | 3/1965 | Clements | 192/48.91 X |
| 3,337,013 | 8/1967 | Wrensch | 192/18 B |
| 3,438,471 | 4/1969 | Wrensch | 192/18 B |
| 3,675,747 | 7/1972 | Obermark | 192/89 B X |
| 4,258,836 | 3/1981 | Miller | 192/84 C |
| 4,353,450 | 10/1982 | Wakefield | 192/84 C |

FOREIGN PATENT DOCUMENTS

| | | | |
|---|---|---|---|
| 1575907 | 1/1970 | Fed. Rep. of Germany | 192/48.2 |
| 156950 | 12/1979 | Japan | 192/84 C |
| 119228 | 9/1980 | Japan | 192/84 C |
| 2071793 | 9/1981 | United Kingdom | 192/48.91 |

Primary Examiner—Rodney H. Bonck
Assistant Examiner—David D. House
Attorney, Agent, or Firm—Markell Seitzman; Russel C. Wells

[57] ABSTRACT

A double acting drive mechanism (10) includes a driving member (12) and a pair of driven members (16) and (18) which carry a small diameter pulley face (24) and a larger diameter pulley face (26) respectively. A clutch mechanism (34) normally couples one of the driven members (16) for rotation with the driving member (12) and the driven member (18) freewheels. Upon energization of the electromagnetic actuator (48), the armature (56), which rotates with the other driven member (18), engages the clutch mechanism (34) to couple the other driven member (18) for rotation with the driving member (12). Engagement of the armature (56) with the clutch mechanism (34) disengages the clutch mechanism (34) from the one driven member (16).

5 Claims, 1 Drawing Figure

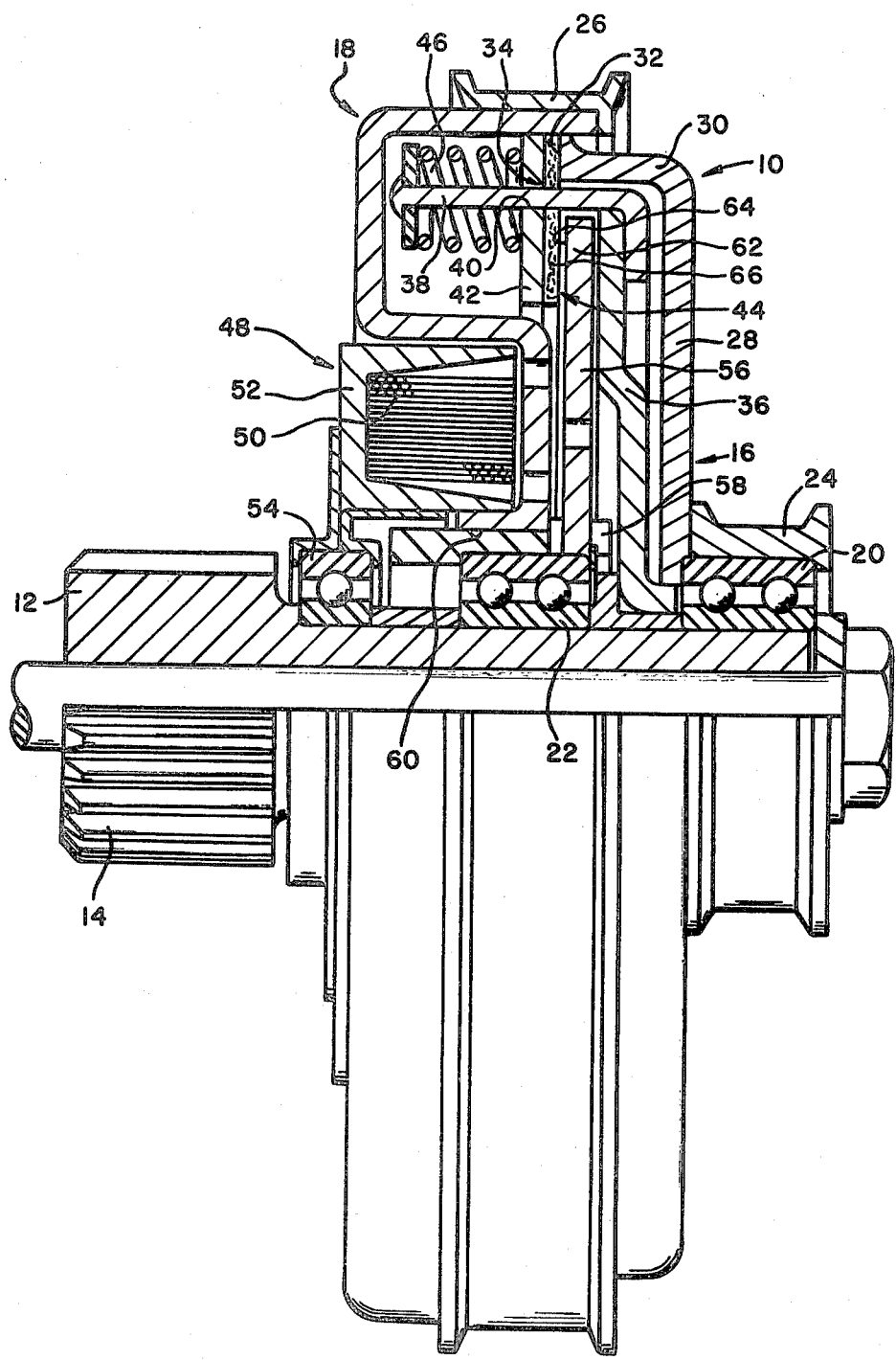

DOUBLE ACTIVE DRIVE MECHANISM

This invention relates to a double acting drive mechanism.

Modern automotive vehicles are normally provided with a number of belt-driven engine accessories, such as a power steering pump, an alternator, and an air conditioning compressor. Since these accessories must be designed to provide sufficient output at relatively low engine speeds, driving these accessories at higher than their design speeds wastes power and, accordingly, increases fuel consumption. However, such accessories have normally been driven by a direct belt drive from the engine at a speed that is a predetermined function of the engine speed. Furthermore, these accessory devices exert a parasitic drag on the vehicle engine during vehicle accelerations. Although this effect was hardly noticeable when most vehicle engines were relatively large, this parasitic drag of the belt-driven accessories is a significant factor which detracts from the performance of the smaller four cylinder engines now in common use.

Accordingly, the present invention saves fuel and increases engine performance by permitting the vehicle engine driven accessories to be driven through either of two belt drives, one of which provides a higher speed and the other of which provides a lower speed. Appropriate sensors are used to sense engine operating conditions such that the slower speed is desirable, and the double acting drive mechanism of the present invention is switched from the higher speed drive to the lower speed drive by the sensors.

While the invention has been disclosed with respect to a vehicle engine accessory drive, it may be used whether a selectively actuatable, two-belt drive is necessary, either on an automotive vehicle or elsewhere, such as on industrial machines. The scope of the invention is to be limited only by the scope of the appended claims.

Other features and advantages of the invention will be apparent in the following description with reference to the accompanying drawing in which the sole FIGURE is a longitudinal cross-sectional view of a double acting drive mechanism made pursuant to the teachings of my present invention.

Referring now to the drawings, the present invention permits driving of the vehicle engine accessories by either one of two separate belts so that the pulley ratios of these two separate belts are different. Accordingly, a two-speed drive is provided. With respect to the drawing, the double acting drive mechanism generally indicated by the numeral 10 includes a driving member 12 that is driven by the vehicle engine through the splined connection 14. A pair of driven members 16, 18 are mounted for rotation with respect to the driving member 12 through bearings 20, 22, respectively. The driven member 16 includes a small diameter pulley face 24 and the driven member 18 includes a larger diameter pulley face 26. The driven member 16 includes a radially projecting portion 28 mounted for rotation with the pulley face 24 that terminates in an axially extending portion 30 which presents a circumferentially extending engagement surface 32. The double acting drive mechanism 10 further includes a clutch member generally indicated by the numeral 34 which includes a circumferentially extending, radially projecting adapter 36 which carries axially extending tangs 38. Tangs 38 are slidably received in apertures 40 in a pressure plate 42 carried by the tangs 38. A circumferentially extending band of friction material 44 is carried on the pressure plate 42. A spring 46 yieldably urges the pressure plate 42 with the friction material 44 into engagement with the engagement surface 32.

Selectively actuatable means, such as an electromagnetic actuator generally indicated by the numeral 48, includes an electromagnetic coil 50 wrapped circumferentially around the driving member 12 and supported within housing 52. The housing 52 is supported on the driving member 12 through a bearing 54 and is held non-rotatable by a bracket (not shown) securing the housing 52 to a non-rotative part of the vehicle. Actuator 48 includes an armature 56 which is slidably mounted on a tang 58 projecting from a bracket 60 which is a part of the driven member 18. Accordingly, the armature 56 is mounted for rotation with the driven member 18 and for axial sliding movement relative thereto. As is well known to those skilled in the art, energization of the coil 50 causes the armature 56 to move toward the coil. The radial outermost portion 62 of the armature 56 presents a circumferentially extending engagement face 64 that is adapted to engage the portion 66 of the friction material 44 adjacent thereto.

In operation, rotation of the driving member 12 also rotates the adapter 36. Rotation of the adapter 36 is transmitted to the radially projecting portion 28 of the driven member 16 through the pressure plate 42, the friction material 44 and the engagement surface 32. Accordingly, the smaller diameter pulley face 24 is normally driven by the driving member 12 and the larger diameter pulley face 26 free wheels on the bearing 22, due to the fact that the armature 56 is separated from the driving connection with the pressure plate 42.

When the aforementioned vehicle speed and/or acceleration sensors sense a vehicle operating condition in which it is desirable to drive the aforementioned accessories through the larger diameter pulley 26 instead of the smaller diameter pulley 24, the coil 50 is energized, thereby moving the armature 56 toward the coil 50. Movement of the armature 56 engages the engagement face 64 with the portion 66 of the friction material 44 attached to pressure plate 42. Additional movement of the armature 56 forces the friction material 44 away from the engagement surface 32, thereby breaking the driving engagement between the driving member 12 and the driven member 16 and initiating driving engagement between the driving member 12 and the driven member 18 through the driving engagement between the engagement face 64 and the portion 66 of the friction material 44. Accordingly, the smaller diameter pulley 24 is then allowed to free-wheel on the bearing 20, and the driving engagement is established between the driving member 12 and the larger diameter pulley face 26 through the driven member 18. When the coil 50 is later deenergized, the spring 46 forces the pressure plate 42 to bring the friction material 44 back into driving engagement with the engagement surface 32, thereby reestablishing the driving connection between the driving member 12 and the driven member 16.

I claim:
1. Double acting drive mechanism comprising:
 a rotatable driving member, a pair of rotatable driven members coaxial with said driving member, and clutch means selectively shiftable from a first condition for coupling one of said driven members to said driving member to a second condition, cou- pling the other driven member to the driving member, said clutch means including first axially movable means mounted for rotation with said driving member, resilient means yieldably urging the first axially movable means into frictional engagement with said one driven member, second axially movable means mounted for rotation with the other member, and selectively actuatable means for moving said second axially movable means into engagement with the first axially movable means wherein, said one driven members includes an engagement face, said first axially movable means including a support mounted for rotation with said driving member, a pressure plate slidably mounted on said support and carrying an engagement surface, said resilient means being carried by said support and acting against said pressure plate to urge the engagement surface into driving engagement with said engagement face.

2. Double acting drive mechanism as claimed in claim 1 wherein said selectively actuatable means moves said second axially movable means into engagement with said pressure plate upon actuation of the selectively actuatable means and moves said engagement surface out of driving engagement with said engagement face.

3. Double acting drive mechanism as claimed in claim 2 wherein said engagement surface includes a portion drivingly engaged by said second axially movable means to provide a driving connection between said support and said second axially movable means through said pressure plate after said second axially movable means moves said pressure plate to break the driving engagement between the engagement surface and the engagement face.

4. Double acting drive mechanism as claimed in claims 1, 2 or 3, wherein said selectively actuatable means includes an electromagnetic actuator having an armature, said armature being defined by said second axially movable means.

5. A two speed drive (10) for an internal combustion engine comprising:
   a driving member (12) adapted to be driven by the engine;
   two driven members (16, 18) mounted on respective bearings (20, 24) to said driving member (12); the first of said driven members (16) supporting a first pulley face (24) and the second of said driven members (18) supporting a second pulley face (26) of larger diameter than said first pulley face and rotatable with said driving member (12), said first driven member (16) comprising a radially projecting portion (28) mounted for rotation with said first pulley face (20) and an axially extending portion (30) which terminates at a circumferentially extending engagement surface (32);
   a clutch member (34) includes a circumferentially extending, radially projecting adapter (36) positioned between said first and said second driven members (16, 18) and a plurality of axially projecting tangs (38) extending towards and received within a depression within said second driven member (18);
   an annular pressure plate (42) having apertures (40) into which each of said tangs (38) extend, said pressure plate (42) being rotationally supported by said tangs (38), said pressure plate including a first circumferentially extending band (44) of friction material mounted for engagement with said engagement surface (32), said pressure plate (42) further supporting a second circumferentially extending band (66) of friction material positioned interior to said first band (44);
   spring means (46) mounted within said depression of said second driven member, attached to each of said tangs (38) for biasing said pressure plate (42) into engagement with said engagement surface (32) of said first driven member (16);
   an electromagnetic actuator (48) adapted to be secured to a nonrotating element of the engine, including a nonrotating coil (50) supported on bearings relative to said driving member, and positioned on one side of said second driven member (18) away from said first driven member (16), said actuator including an armature plate (56) positioned between said second driven member (18) and said adapter (36), said armature plate (56) rotationally fixed to said driving member, said plate further axially movable relative to said second driven member in response to magnetic flux generated by said coil, said plate engagably positioned relative to said second band of friction material so as to move said pressure plate (42) from engagement with said engagement surface of said first driven member thereby decoupling said first driven member from said driving member in response to energization of said electromagnetic actuator.

* * * * *